(12) United States Patent
Neal

(10) Patent No.: US 7,555,490 B1
(45) Date of Patent: Jun. 30, 2009

(54) TEXT-BASED SEARCHES OF NUMERIC DATA

(75) Inventor: Michael R. Neal, Superior, CO (US)

(73) Assignee: Click Commerce, Inc., Chicago, IL (US)

( * ) Notice: Subject to any disclaimer, the term of this patent is extended or adjusted under 35 U.S.C. 154(b) by 214 days.

(21) Appl. No.: 10/174,241

(22) Filed: Jun. 17, 2002

(51) Int. Cl.
*G06F 17/30* (2006.01)
(52) U.S. Cl. .............. 707/102; 707/3; 707/4; 707/5; 707/6; 707/104.1; 705/26
(58) Field of Classification Search ........... 707/1–7, 707/9–10, 100–102, 203, 104.1; 704/9; 705/14, 705/27, 26
See application file for complete search history.

(56) References Cited

U.S. PATENT DOCUMENTS

| | | | | |
|---|---|---|---|---|
| 5,740,425 A | * | 4/1998 | Povilus ..................... 707/100 |
| 6,055,516 A | * | 4/2000 | Johnson et al. ............... 705/27 |
| 6,377,937 B1 | * | 4/2002 | Paskowitz .................... 705/26 |
| 6,678,695 B1 | * | 1/2004 | Bonneau et al. ............. 707/102 |
| 6,697,799 B1 | * | 2/2004 | Neal et al. ..................... 707/3 |
| 6,728,706 B2 | * | 4/2004 | Aggarwal et al. .............. 707/5 |
| 7,031,554 B2 | * | 4/2006 | Iwane ......................... 382/305 |
| 2002/0002502 A1 | * | 1/2002 | Maes et al. ................... 705/26 |
| 2003/0061121 A1 | * | 3/2003 | Ouchi .......................... 705/27 |
| 2003/0083961 A1 | * | 5/2003 | Bezos et al. .................. 705/27 |
| 2003/0212669 A1 | * | 11/2003 | Dedhia et al. .................. 707/3 |
| 2005/0234888 A1 | * | 10/2005 | Bailey et al. ................... 707/3 |

* cited by examiner

*Primary Examiner*—Debbie M Le
(74) *Attorney, Agent, or Firm*—Christopher J. Kulish

(57) ABSTRACT

The present invention can allow a user to locate items in a database based on numeric characteristics of the items using words to describe those characteristics. In one embodiment, the invention includes selecting a numeric attribute of an item in a database of items some of which have values for the selected attribute, linking the numeric attribute to a descriptive word, linking the numeric attribute to a function, executing the function on values of the numeric attributes, and assigning a descriptive word to an item based on the results of the function.

53 Claims, 10 Drawing Sheets

FIG. 2

John Smith Product Search

John Smith Product Search  300

TPC POWER DRILLS    [SEARCH]  [HINTS]

Search string may include category, part number, manufacturer, description
☐ Include priced products only    ● Table display    ○ Web-style display 304 {
○ Show all categories with *Power Drills* or click a category below
● Power Drills
306
}

1-6 of 6 Items Matching Search

310

| | Chuck Size ✖▽△ | Speed Rating ✖▽△ | Weight ✖▽△ | Power Rating ✖▽△ | Type ✖▽△ | Power Source ✖▽△ | Short Description  318  320  322 ✖▽△ |
|---|---|---|---|---|---|---|---|
| 1 | 3/8 in | 300 - 1500 rpm | 2.25 lb | 2.5 hp | Reversible | Corded Electric | Drill, electric, 1/2 in chuck, reversible, 2 speed, 300 rpm - 600 rpm, 800 rpm - 1500 rpm, 2.5 hp output, corded, 2.25 lbs |
| 2 | 1/4 in | 600 rpm | 1.5 lb | .5 hp | Driver | Cordless Electric | Drill, Driver, cordless, 1/4 in chuck, 1 speed, 600 rpm, .5 hp output, 1.5 lbs. |
| 3 | 3/8 in | 300 rpm | 2.15 lb | 100 watts | Hammer | Corded Electric | Drill, Hammer, electric, 3/8 in chuck, 1 speed, 300 rpm, 100 watt, corded, 2.15 lbs. |
| 4 | 1 in | 2500 rpm | 4.4 lb | 3 hp | Impact | Gas Powered | Drill, Impact, electric, 1 in chuck, 1 speed, 2500 rpm, 3 hp, gas powered, 2 kg. |
| 5 | 3/8 in | 1200 rpm | 2 lb | 150 watts | Hammer Driver Drill | Corded Electric | Drill, Hammer Driver, electric, 1 speed, 1200 rpm, 150 watt, corded, 2 lbs |
| 6 | 1/2 in | 1500 rpm | 3 lb | 3 hp | Reversible | Corded Electric | Drill, Reversible, electric, 1 speed, 1500 rpm, 3 hp, corded, 3 lbs. |

[NEXT ▲]  308

302
[View Cart]

FIG. 3

John Smith Product Search

John Smith Product Search 300

TPC POWER DRILLS    (SEARCH)  (HINTS)
Search string may include category, part number, manufacturer, description
☐ Include priced products only  ● Table display  ○ Web-style display 304 {
○ Show all categories with *Power Drills* or click a category below
● Power Drills
306

310                                                                    [View Cart]

1-6 of 6 Items Matching Search

| | Chuck Size ✕▽△ | Speed Rating ✕▽△ | Weight ✕▽△ | Power Rating ✕▽△ | Type ✕▽△ | Power Source ✕▽△ | Chuck Alias ✕▽△ | Speed Alias ✕▽△ 318 | Power Alias 322 ✕▽△ 320 |
|---|---|---|---|---|---|---|---|---|---|
| 1 | 3/8 in | 300 - 1500 rpm | 2.25 lb | 2.5 hp | Reversible | Corded Electric | small | widest, broadest, slow, medium | powerful, strong |
| 2 | 1/4 in | 600 rpm | 1.5 lb | 5 hp | Driver | Cordless Electric | smallest, small | slow | low, light |
| 3 | 3/8 in | 300 rpm | 2.15 lb | 100 watts | Hammer | Corded Electric | small | slowest, slow | lowest, low, light |
| 4 | 1 in | 2500 rpm | 4.4 lb | 3 hp | Impact | Gas Powered | largest | fastest | strongest, powerful, strong |
| 5 | 3/8 in | 1200 rpm | 2 lb | 150 watts | Hammer Driver Drill | Corded Electric | small | average, medium | low, light |
| 6 | 1/2 in | 1500 rpm | 3 lb | 3 hp | Reversible | Corded Electric | medium | average, medium | strongest, powerful, strong |

302

[NEXT ▲] 308

*FIG. 4*

John Smith Product Search

John Smith Product Search    300

TPC ABRASIVE DISCS
Search string may include category, part number, manufacturer, description
☐ Include priced products only   ⦿ Table display   ○ Web-style display
(SEARCH) (HINTS)

304 { ○ Show all categories with *Abrasive discs* or click a category below
     ⦿ Abrasive Discs
306

1-6 of 6 Items Matching Search    310

(View Cart)

| | Arbor Hole Size ⌘▽△ | Diameter ⌘▽△ | Grit | Material ⌘▽△ | Maximum Speed ⌘▽△ | Thickness ⌘▽△ | Type ⌘▽△ | Short Description 318 322 320 ⌘▽△ |
|---|---|---|---|---|---|---|---|---|
| 1 | 3/8 in | 6 in | 220 | Silicon Carbide | 1500 rpm | 1/16 in | Wood Finishing | Disc, Abrasive, 6 in, 3/8 in arbor, 220 grit, 1/16 in, 1500 rpm max, wood finishing, silicon carbide. |
| 2 | 1/2 in | 3 in | 100 | Aluminum Oxide | 800 rpm | 1/32 in | Metal Sanding | Disc, Abrasive, 3 in, 1/2 in arbor, 100 grit, 1/32 in, 800 rpm max, metal sanding, aluminum oxide |
| 3 | 3/8 in | 12 in | 300 | Silicon Carbide | 1500 rpm | 1/8 in | Metal Polishing | Disc, Abrasive, 12 in, 3/8 in arbor, 300 grit, 1/8 in, 1500 rpm max, metal polishing, silicon carbide |
| 4 | 1/2 in | 7.25 in | 60 | Garnet | 500 rpm | 1/16 in | Wood Rough Sanding | Disc, Abrasive, 7.25 in, 1/2 in arbor, 60 grit, 1/16 in, 500 rpm max, wood rough sanding, garnet |
| 5 | 1/2 in | 6 in | 80 | Aluminum Oxide | 500 rpm | 1/8 in | Metal Abrading | Disc, Abrasive, 6 in, 1/2 in arbor, 80 grit, 1/8 in, 500 rpm max, wood metal abrading, silicon carbide |
| 6 | 3/8 in | 6 in | 100 | Aluminum Oxide | 600 rpm | 1/16 in | Wood Sanding | Disc, Abrasive, 6 in, 3/8 in arbor, 100 grit, 1/16 in, 600 rpm max, wood sanding, aluminum oxide |

302

(NEXT ▲) — 308

FIG. 5

John Smith Product Search

John Smith Product Search — 300

TPC ABRASIVE DISCS  (SEARCH) (HINTS)
Search string may include category, part number, manufacturer, description
☐ Include priced products only  ● Table display  ○ Web-style display 304 { ○ Show all categories with *Abrasive discs* or click a category below
      ● Abrasive Discs
      — 306

1-6 of 6 Items Matching Search — 310

[View Cart]

| | Arbor Hole Size ✕▽△ | Diameter ✕▽△ | Grit | Material ✕▽△ | Maximum Speed ✕▽△ | Thickness ✕▽△ | Type ✕▽△ | Aliases  318 ✕▽△ 322 320 |
|---|---|---|---|---|---|---|---|---|
| 1 | 3/8 in | 6 in | 220 | Silicon Carbide | 1500 rpm | 1/16 in | Wood Finishing | medium diameter, fine grit |
| 2 | 1/2 in | 3 in | 100 | Aluminum Oxide | 800 rpm | 1/32 in | Metal Sanding | small diameter, medium grit |
| 3 | 3/8 in | 12 in | 300 | Silicon Carbide | 1500 rpm | 1/8 in | Metal Polishing | large diameter, largest diameter, fine grit, finest grit |
| 4 | 1/2 in | 7.25 in | 60 | Garnet | 500 rpm | 1/16 in | Wood Rough Sanding | coarse grit, medium diameter |
| 5 | 1/2 in | 6 in | 80 | Aluminum Oxide | 500 rpm | 1/8 in | Metal Abrading | medium diameter, coarse grit |
| 6 | 3/8 in | 6 in | 100 | Aluminum Oxide | 600 rpm | 1/16 in | Wood Sanding | medium diameter, medium grit |

302

[NEXT ▲] — 308

FIG. 8

Numeric Search Aliases Summary

Summary of Current Numeric Aliases — 801

Catalog: MRO Components — 803

User: Administrator — 805

807

| Numeric attribute | Categories | Function | Parameter Value | Aliases | Tolerances | Target Attribute |
|---|---|---|---|---|---|---|
| ☐ Power Rating | Power Drills | Less Than | 2.5 | low | .1 | Power Alias |
| ☐ Grit | Abrasive Discs | Greater Than | 200 | fine grit | none | Aliases |

[Remove Selected] — 809   [Edit Selected] — 811   [Add New Alias] — 813

Set action when item is added, deleted, or modified in the catalog

● Update aliases — 815
○ Update according to schedule [Daily at 2300 ▼] [New Time] — 817
○ Do not update — 819

[Close]

TEXT-BASED SEARCHES OF NUMERIC DATA

BACKGROUND OF THE INVENTION

1. Field of the Invention

The present invention relates to retrieving, sorting, selecting and organizing items in a database, such as an electronic catalog, using numeric description of the items. More particularly, the invention relates to associating descriptive words with items based on the numeric descriptions.

2. Description of the Related Art

Searchable electronic catalogs (e-catalogs) are commonly used in support of various electronic commerce and purchasing functions. These catalogs typically have a user interface for selectively retrieving and displaying records as well as a system for electronically purchasing any items that are selected. A critical factor in the acceptance and success of electronic catalogs is how well they allow a user to find a desired item. As electronic catalogs grow and the number of similar items increases, it becomes increasingly harder to compare the items that are available and to find items with a set of desired features.

The conventional finding aids for an e-catalog are a taxonomical hierarchy of categories and classifications and a search engine. A search engine will typically allow a user to search for particular key words and then display the search results. The key word search, however, requires that the user know all possible key words that might be used to describe a particular item or feature of the item. If the catalog has a large number of items, it is also likely that undesired, unrelated items will also be found in the search together with the desired types of items.

A key word search works especially well for data with extensive and thorough text descriptions. In many search engines, a key word search can be enhanced by also searching for numerical values for items. Numerical values can range from dimensions or operating capabilities and parameters to the price of the item. Some catalogs allow items to be sorted or ranked based on such numbers or for a search to be made for a particular numerical value.

The sorting and ranking steps normally involve additional steps and require the user to identify the attributes to which the sorting will be applied. Searching for numerical values requires that the user already know the ranges that are available. While this can be used to find a five pound nail or a fifteen inch wheel, it cannot easily be used to find a 180 cm bookcase. Bookcases may or may not be available at exactly 180 cm tall but instead at 174 cm and 186 cm. In addition, a user may prefer a particular 178 cm bookcase to an available 180 cm bookcase. Numeric values are particularly cumbersome for comparative searches. If a user is looking for the sharpest pencil, the fastest computer, the smallest table, the largest pipe wrench, or a medium size bookcase, the user must first find a group of items, then apply several sorting tools to determine which ones meet the desired criteria.

SUMMARY OF THE INVENTION

The present invention can allow a user to locate items in a database based on numeric characteristics of the items using words to describe those characteristics. In one embodiment, the invention includes selecting a numeric attribute of an item in a database of items some of which have values for the selected attribute, linking the numeric attribute to a descriptive word, linking the numeric attribute to a function, executing the function on values of the numeric attributes, and assigning a descriptive word to an item based on the results of the function.

Other features of the present invention will be apparent from the accompanying drawings and from the detailed description that follows.

BRIEF DESCRIPTION OF THE SEVERAL VIEWS OF THE DRAWINGS

The appended claims set forth the features of the invention with particularity. The present invention is illustrated by way of example, and not by way of limitation, in the figures of the accompanying drawings in which like reference numerals refer to similar elements and in which:

FIG. 2 is an example display of a list of power drills from an electronic catalog system;

FIG. 3 is an example display similar to FIG. 2 showing associated descriptive words;

FIG. 4 is an example display of a list of abrasive discs from an electronic catalog system;

FIG. 5 is an example display similar to FIG. 4 showing associated descriptive words;

FIG. 8 is an example display of a graphical user interface for man aging text-based searches of numeric attributes of catalog items;

DETAILED DESCRIPTION OF THE INVENTION

I

The present invention allows a user to find items that include numerical descriptions using text based searches. Any number of items can be sorted and compared automatically and linked to descriptive values. The descriptive values can be superlatives such as largest, fastest, longest, and hardest, comparatives, such as larger, higher, and softer, positives, such as small, slow, and short, or any other type of descriptive word. The descriptive words can then be made available for searching. As a result, a user can quickly find the faster computers or higher pressure valves or hard pencils using a single search string.

Multiple descriptive words can be added to the database to increase the relevance with respect to numeric values of any items found by a text search. Parametric and numeric searching can often find the desired items. However, there are some cases where a descriptive word, if applied consistently to numeric attributes of the items, can make a tremendous improvement to the user's experience. For example, a query such as, "fastest computer with the most memory," makes sense to a typical user but will not likely function correctly in an electronic catalog search. While it is possible to manually assign descriptions such as fastest and most to particular items, this process becomes unmanageable and difficult if not impossible to monitor as the catalog size and complexity grows. Therefore, the present invention provides a system that can attach descriptive words to items based on numeric values and maintain the connections even as the content of the database changes.

II

Figure 1:
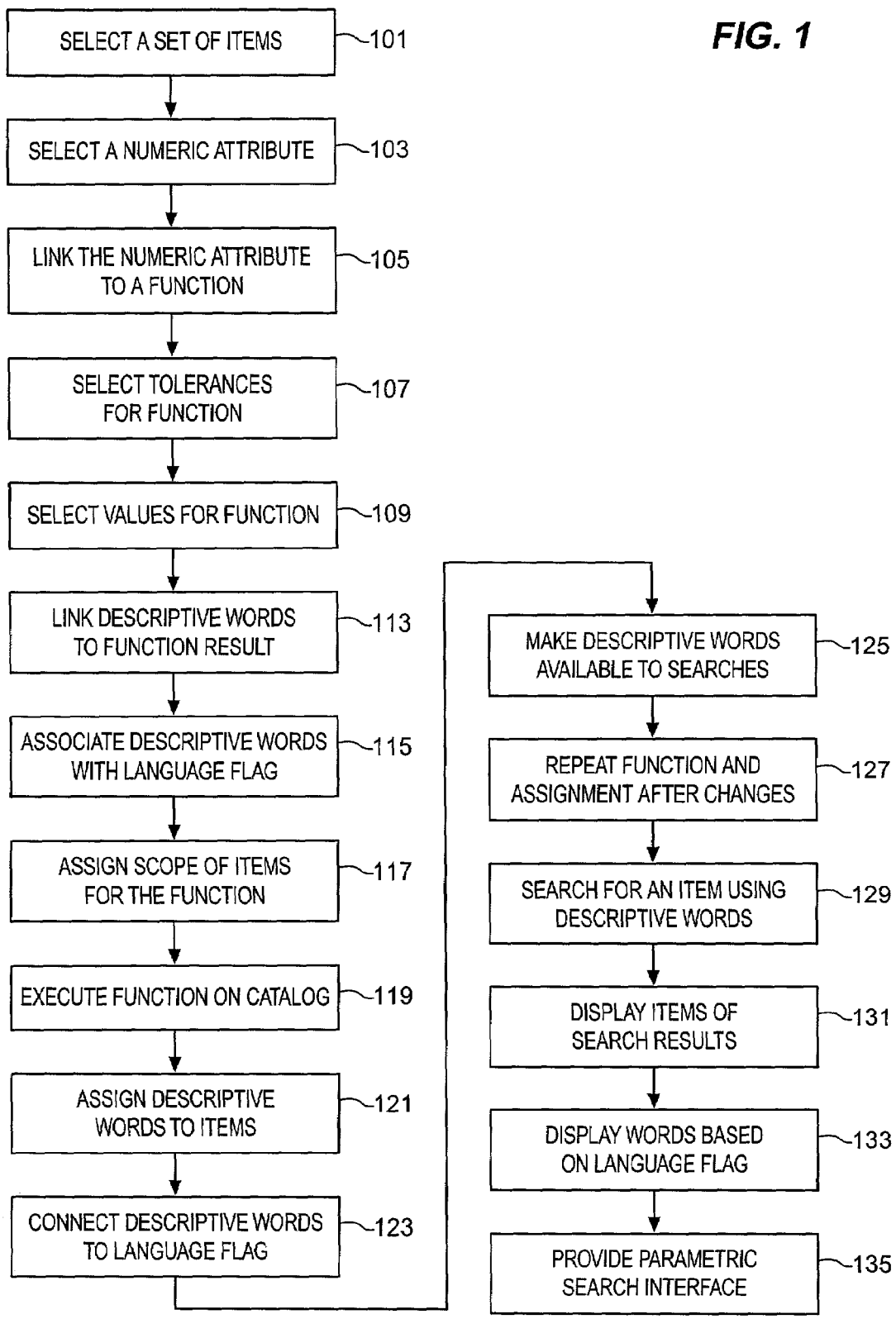
FIG. 1 is a flow diagram of configuring text-based searches of numeric attributes of catalog items.

Referring to FIG. 1, a process is described that can make it easier to find items in a database or catalog. In one embodiment a database or catalog administrator can set up a search index in which the catalog data is compared against either specified values or specified values with tolerances. The results of the comparisons are linked to descriptive words or aliases that a catalog user can search. To begin, a set of items is selected 101. This can be done automatically or manually by an administrator. It can also be done using predefined policies for particular types of items. In the present example, the selected items will be the six items in the power drills category shown in FIG. 2.

To apply a function for describing items, a numeric attribute of the power drills is selected 103. As can be seen in FIG. 2, if the administrator accesses a listing of the selected group of items, then the display of attributes can be used to select one of the attributes. Any of the numeric attributes can be used. The selected attribute can be unique to particular types of items, such as chuck size or speed rating or it can be a more generic attribute such as weight, price or part number. Consider the example of speed rating. Having selected speed rating, this numeric attribute is then linked to a function 105. Typically this function will be a mathematical operation to be performed on the numerical values for the data describing attributes of the selected items. For the descriptive word "fastest" the function will be to select the largest number for the speed rating (e.g., max( )). In the example items of FIG. 3, the largest number in the category is 2500 rpm for item 4. In brief, having configured the index as described, the system will go through all of the power drills and identify item 4 as fastest. It will then link descriptive words such as "fastest", "highest speed" and any selected synonyms or other aliases with item 4.

The function can be further defined with tolerances 107. Tolerances can permit several items to be the fastest or the average. In a simple example, a maximum function can rank items based on magnitude and then a tolerance can allow a specified number of items to be identified as the maximum. These items will all be linked to the descriptive words. In the example of the power drills, the slowest drill is item 3 at 300 rpm. By enlarging the number of possible slowest drills with a tolerance, items 2 and 5 can also be listed as slowest. In a more complex embodiment, the tolerance can be determined dynamically based on the selected items. So, for example, the tolerance can be set to a selected percentage of the selected items. In the example of the six power drills, it may be sufficient to identify a single drill as fastest or slowest or heaviest or most powerful. However, if the catalog has 600 power drills, then it may be better to select the fastest ten percent or one percent of the drills as the fastest. With a large number of items, there are likely to be many items with very similar values. By designating a percentage of the selected items or some other dynamically variable tolerance, the results can be modified as the catalog changes without additional administrative time.

Tolerances can be even more useful for functions that do not relate to superlatives. A function associated with words like medium, fast, average, etc. can give a better result if several items can be listed. A user seeking a lightweight drill, rather than the lightest drill will expect to see several items resulting from a search. A function for lightweight can even be defined in terms of the tolerance. For example, the descriptive terms "light" and "lightweight" can be associated with a function that ranks the items based on the numerical values for a weight attribute and then selects the lowest twenty percent of the items.

For some functions such as average, mean, and percentile, there may not be any particular item that matches the calculated value. Tolerances can help again. Tolerances can be set to select the ten items closest to the calculated value or the ten percent of items closest to the value. In a more sophisticated embodiment, the tolerance can be based on other calculated values such as standard deviation or a percentage of the average, etc. So, for example, with the drills, the average weight is 2.55 lb. This weight does not correspond to any one of the listed items. For a function that can be linked with descriptive words such as "average" or "medium", a tolerance can be used to ensure that some items are associated with the words. The tolerances can be defined in a variety of different ways. For the power drills, the tolerance can allow for the three closest items to be selected (items 1, 3, and 5), or for the closest twenty percent of the items to be selected (item 1) or for items within twenty percent above or below the average value to be selected (items 1, 3, and 6). The particular tolerance selected and the function with which it is associated can be adapted to suit any particular set of items and any particular objectives for helping users find items.

In some cases, it may also be appropriate to select values to be used by or with the function 109. The administrator could decide, for example, that all power drills faster than 1000 rpm can be described as "fast." The function for finding "fast" power drills would then look for speed rating values higher than 1000 (e.g., >1000). The value of 1000 is provided as an example, and the particular values to apply to a function will depend on the particular goods selected. While 1000 may be fast for drills, for automobile engines, for example, 1000 rpm is generally not considered to be fast. There are many different possible functions that can be used including maximum, minimum, less than, greater than, average, and equals. Combining the less than, greater than, and equals functions can create ranges. For example, lengths less than 12" (<12") can be linked to small, lengths between 12" and 36" can be linked to "medium" (>12" and <36"), and lengths greater than 36" (>36") can be linked to large.

Descriptive words can then be linked to the results of executing the defined function 113. To assist the administrator in selecting the descriptive words, a pick list can be provided. Appropriate descriptive words for an attribute such as speed might be fast, fastest, slow, slowest, average, medium, high speed, medium speed, etc. For speed ranges as in item 1, descriptive words such as wide, broad, narrow, etc. might be used. In some fields, speed can be described in different ways. In computers, for example, a high speed processor can be described as powerful, whereas for the drills, power rating is a separate attribute. The administrator can select a single word or a group of words. For a price attribute, the administrator might select, high, expensive, costly, pricey and dear to indicate a large magnitude in the price field. The descriptive words can be considered as aliases for the respective numerical attribute.

The particular words to be associated with the numeric attribute will also depend on the language. While 1200 rpm can be understood in many languages, fastest is primarily an English language word. If the catalog is to support different languages, then, each descriptive word can be associated with a language flag 115. The language flag is relied upon for searching and for display.

After the parameters of the function have been set, and before or after the descriptive words have been selected, the function can be executed on the catalog 119. The function can be executed against a selected list of items, such as the power drills of FIG. 2 or against the entire catalog or database. As a result of the execution, a list of items will be returned. The list may have no items or many items. For a superlative, such as fastest processor speed, there may be a single item, or there may be several different items that all operate using the same processor. If the parameters for the function are set outside the range of values in the catalog, then there may be no results.

Once the list of items is identified, then the linked descriptive words can be assigned to those items 121. The assignment can take many different forms. FIG. 3 shows an example search display as applied to the power drills. In the example of FIG. 3, an additional attribute has been added to each item containing descriptive words for a particular numerical attribute. The chuck size values have been identified with the descriptive words of smallest, small, medium and largest. Each word has been associated with each item as would be appropriate based on a function of the type described above. Descriptive words such as large and average are not shown. This can occur if there are no results when executing the function, if a corresponding function is not defined for the items, or if the function is not associated with the particular absent words. Similarly the values for speed rating have been identified with the descriptive words of slowest, slow, average, medium, fastest, widest and broadest. The values for power rating have been identified with low, light, powerful, strong, and strongest. In each case, the choice of descriptive words tries to anticipate how a user would search for an item. The administrator has assumed that when looking for a power drill with a low power rating, a user might search for "light." The selection of descriptive words becomes important in making items easier to find.

The structure shown in FIG. 3, is helpful in showing how words are associated with numeric values, however, many other ways of associating the descriptive words and the items are possible. In one embodiment, the descriptive words are added to the numeric values for the particular attribute. In another embodiment, an index is created that links the corresponding descriptive word or search term to the item. In another embodiment, the words are added to the short description. The most effective way of associating the words with an item will depend upon the structure of the database.

The words shown in the example of FIG. 3 are all English language words that would be helpful to a user searching an English language catalog in English. For a catalog or database that operates in several different languages, these words can all be connected to an English language flag 123. Similar words in other languages can also be associated with the items and flagged with an appropriate language flag. When the user selects a particular language for using the catalog, the flags can be used to determine which descriptive words to apply. This can be done in a manner similar to the rest of the textual information in the database.

Having assigned the words and flagged the language, the assigned descriptive words can be made available for searches 125. The descriptive words can also be made available for display whether or not they are used in a search. A user after performing a search for power drills, for example, might receive a display like the one in FIG. 3. The user, relying on the alias columns can quickly identify which drills are the strongest, most powerful etc, without referring to the numerical values. While it is fairly simple for a user to select the fastest drill by scanning a list of six drills, if 600 drills were displayed, then the selection would be made harder. Using the viewing and navigation tools described below, the user could also sort the items based on the alias column so that all the fastest drills would be grouped together.

The application of functions, values, tolerances, and rankings allows the descriptive words to be reassigned when the catalog or database is changed 127. With a typical electronic catalog, some items will be discontinued and new items will be added. As a result, the fastest or slowest drill may no longer be available or there may be a new drill that is still faster or slower. Because the functions are already configured, they can be reapplied at any time 127. The re-execution of the functions and the re-assignment of descriptive words can be performed whenever new items are added, existing items are deleted, updates are performed, or based on a specified time or timing interval. The success of any search will rely on all of the data being properly updated and configured including the descriptive words. The best selection of parameters for re-executing the functions will depend on many factors, including the usage of the catalog and the frequency of updates. These parameters can be selected by the administrator.

In one embodiment, whenever an item is added to the catalog, the values are recalculated. Items can be added as batches of products or one at a time. Alternatively, the values are recalculated after an entire load or in time intervals. Accordingly, if a numerical attribute for a dimension is tied to the descriptive term "longest" which is related to a function max( ), then the max( ) function will be rerun on the items after each load. If the value that was responsive to the max( ) function is no longer responsive to the max( ) function, then the alias "longest" will be removed from the former item and added to the appropriate new item. If the system is configured to perform these updates automatically, then the catalog administrator does not need to do any maintenance other than making the administrative settings and definitions.

A significant benefit of the descriptive words is that they can be used to search for an item in the catalog 129. A particularly useful application of the descriptive words is as a sort of natural language searching aid. This can be done by allowing the user to type in a query, e.g. "find me the fastest drill" and then searching for those words throughout the catalog. Such a query should lead to the drill category listing shown, for example, in FIG. 2 and to item 4 which has been associated with the word fastest. In the example of FIGS. 2 and 4, there is little overlap between descriptive words, so the search query can often be interpreted unambiguously. If, on the other hand, the user were to search for a medium drill, then the drill might be selected based on chuck size or on speed rating or both. The results can reflect hits in both attributes.

Alternatively, the aliases can be linked to the particular attribute. So, for example, to find a medium chuck size, the user specifies "chuck" and "largest" in the query. This connection can be made by expanding the descriptive words to include the attribute names, or it can be made by associating the descriptive word and the name of the attribute as is shown, for example, in FIG. 3. The system can be configured to automatically generate aliases by combining the descriptive words with the corresponding numeric attribute's name (see e.g. FIG. 5). These aliases can be used in natural language searching. For example, assume that in a catalog a function performed on an attribute of processor speeds determines that a 2000 MHz value is assigned the aliases "fastest," and "most powerful." This can be used to automatically create a text searchable string "fastest processor" by combining the descriptive word with the numeric attribute name.

After the items are selected based on the query, they can be displayed or rendered in some way for the user 131. The descriptive words can also be displayed. In a multi-lingual catalog, such a display will be based on the language flag 133. The display and the user's ability to find an item can be further enhanced by a range of other tools as well. One such tool can be referred to as "parametric refinement." If the search for fastest provided several computers of the same or similar speeds, the user could refine on the descriptive word "fastest" 135 to isolate the display to only the fastest computer. In the example of 600 drills, reducing the list to only 10 or 20 might be very helpful. The "parametric refinement" or any other finding aids need not be limited to the searched words. Considering the example of FIG. 3, if a search were made for small chuck size drill, yielding items 1, 2, 3, and 5, the user could refine on strong, to further restrict the list to items 1 and 4. Combining these catalog finding aids can greatly improve the user's experience with the catalog.

III

Consider the example of a search display 22, shown in FIG. 2 in more detail. The details are similar also in FIGS. 3, 4, and 5. This display already includes the results of a search, in this case a list of power drills. The display, in this example, has a single text box 300 for search strings located in the upper-left corner of the display. The example search string in the search box 300 is "TPC power drills" which represents three words to be found in any part of the data record corresponding to each item. TPC was found in the supplier name field and power and drill were found in the description. Search strings may be applied against specific fields or attributes of each item and there may be separate text boxes for different parts of the search strings. Searches can also be conducted using ranges for numerical or alphabetical values. The single box shown in FIG. 2, however is simpler to use. The display has several other areas of information, as shown in FIG. 2. The search results or list of identified items is shown in a display list 302. The display list 302 includes, the chuck size, the speed rating, the weight, the power rating, the type, the power source, and the short description. Any number of other attributes can also be displayed including, for example, the manufacturer name and part number, a long description, a supplier name and part number, colors, availability, etc. For each of these fields, values are shown for each item or record.

A compilation of each unique category of product, compiled from the list of the identified items, is shown in a category display area 304. If several different categories of products were found during the search, then each category will be displayed along with a corresponding CATEGORY radio button 306. The user can narrow the list by selecting one of the categories. In FIG. 3, power drills has been selected, so only power drills are displayed. If the desired item from the catalog is not immediately visible in the display, the user has the option of paging through the remaining items in the list by clicking on a NEXT button 308. If the desired item is found, no further searching is required.

The display of FIG. 3 includes several other items that can be very helpful in finding an item. These features are intended to be used by selection on a graphical user interface. The selections can be made by moving a pointing device to the corresponding button, icon or text and then indicating a selection of the button, icon or text. Typically this is done by pointing and clicking with a mouse, however, any other selection device can be used. In addition, different user interface tools can be applied as alternatives, such as function keys, text commands, voice response, keypad buttons, pull-down menus, etc. The GUI shown in the figures is intended as one example that can easily by implemented using current technology.

Each column includes a REMOVE button 318, a SORT UP button 320, a SORT DOWN button 322, and a selectable attribute name 310. The REMOVE button 318 removes the column from the display. The column can be recalled later, but by removing the column, more room is provided for other columns to be displayed on the screen. Removing the information from the display does not remove it from the database, the information can still be used in sorting and searching even though it is not seen on the display. The sorting buttons allow the items in the table to be sorted based on the value for the particular attribute. The SORT UP button 320 sorts the items in ascending order, while the SORT DOWN button 322 sorts the items in descending order of the value for the attribute.

By selecting the attribute name 310, the display can be refined based on the selected attribute. One such parametric refinement is to restrict the display to items having a single highlighted value for the attribute. In this embodiment, a desired attribute value is first selected, then the attribute name is selected to refine on that value. In another embodiment, selecting the attribute value causes the interface to generate a dialog box. From this dialog box, the user can input a selected value for parametric refinement, or a range of values. The dialog box can also provide sorting and display options as an alternative to all the separate buttons discussed above.

IV

FIG. 5 shows another example set of six items. The representative six items are in an abrasive disks category and have different values displayed for attributes of arbor hole size, diameter, grit, material, maximum speed, thickness, type, and short description. As with the power drills of FIGS. 2 and 3, the abrasive disks may have many more attributes which are not displayed including supplier, price, availability, part numbers backing material etc. These characteristics can be viewed using the navigation buttons as described above.

Figure 6:
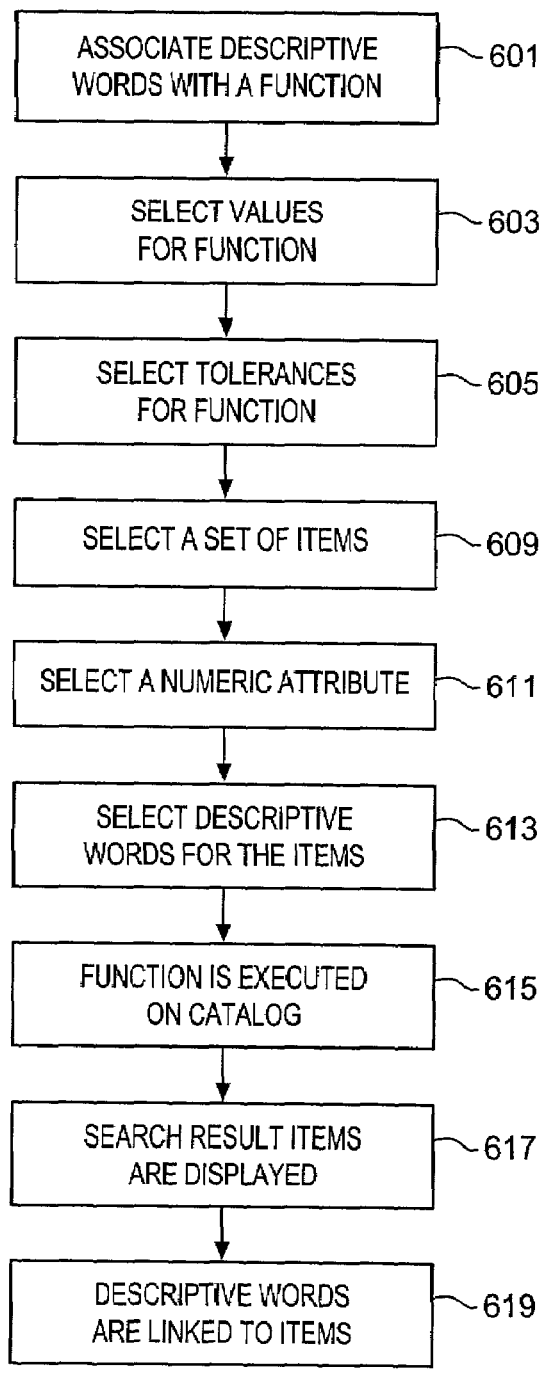
FIG. 6 is a flow diagram of an alternative embodiment of configuring text-based searches of numeric attributes of catalog items.

In FIG. 6, functions have been applied to the numeric attributes of diameter and grit. However, in this example as compared to the power drills in FIG. 3, the descriptive words have been combined with the attribute name and all of the aliases have been placed in the same searchable field. Accordingly, for the diameter parameters, the attribute name "diameter" has been combined in each case with the descriptive words medium, small, large and largest. Similarly, the word "grit" has been added to the descriptive terms finest, fine, medium, and coarse. Any of the other numeric attributes can be used to form similar descriptors. In addition, as mentioned above, these descriptors may be associated with any other aspect of an item's description, including the short description, the particular attribute involved or a separate index. This may simplify the structure of the database with no significant impact on search time. Of course, as mentioned above, the data may be searched with indexes and not directly.

V

FIG. 6 shows an alternative process flow for the present invention. In FIG. 6, the descriptive words are assigned in response to a user search request and not as a result of administrative settings. This increases the user's control and simplifies the initial setup but can require longer search times. On the other hand, the results are always certain to be based on the latest condition of the catalog. In the initial configuration, descriptive words are associated with a particular function 601. This can result in similar associations to the ones mentioned before. Largest, heaviest, longest and similar words can be associated with a maximum function. Medium can be associated with an averaging function etc. These settings are made in the absence of any knowledge of the items involved and can be done without knowledge of the attribute involved. Some descriptive words can be tied to specific attributes. For example, "most expensive" can be limited to the price.

As was done for the example of FIG. 1, values are selected for each function 603, and tolerances are selected for each function 605. The system is now configured for a search. To perform a search, the user selects a set of items 609. The items can be any in the catalog and can be a result of a search, a selection of a category, a selection of a manufacturer or any other grouping of category items. The user can then select a numeric attribute 611 to which the functions are to be applied. This will be the basis of the next search.

To set the parameters for the search, the user selects descriptive words for the items 613. The descriptive words can be ones that have been previously linked to a function as described above. The user can try different words or a pick list can be presented. Of course, the descriptive words can be selected first and then the attribute name selected. If certain words have been linked to a particular attribute as in the example of "expensive" being linked to price, then those words can be presented in the pick list when the attribute is selected. The words linked specifically to a particular attribute can even be presented first.

The user has now selected a pre-configured function to be performed on the selected data set. The system executes the function on the catalog 615 and then displays the results 617. The descriptive words can be shown in the search box or in association with the item. In one embodiment, the descriptive words can be linked to the items 619 so that the function need not be executed the next time a user makes the same query. However, to ensure the highest level of accuracy, this would require tracking updates so that if the items have been updated, the function will execute again.

In one example, the attributes can be parametrically refined so that all of the items matching the selected characteristics of the numeric values are isolated into a single results set. Accordingly, a material can be checked with an equals operator so that materials of a value 5.0 and less are assigned "weakest" and "softest". Materials with a value of 50.0 and greater are assigned the value "strongest" and "hardest". All other items are assigned the value "neutral". The user can find a subset of the items through a text search and parametrically refine based on the descriptive term "strongest". As a result all items with values greater than 50.0 are displayed.

VI

Figure 7:
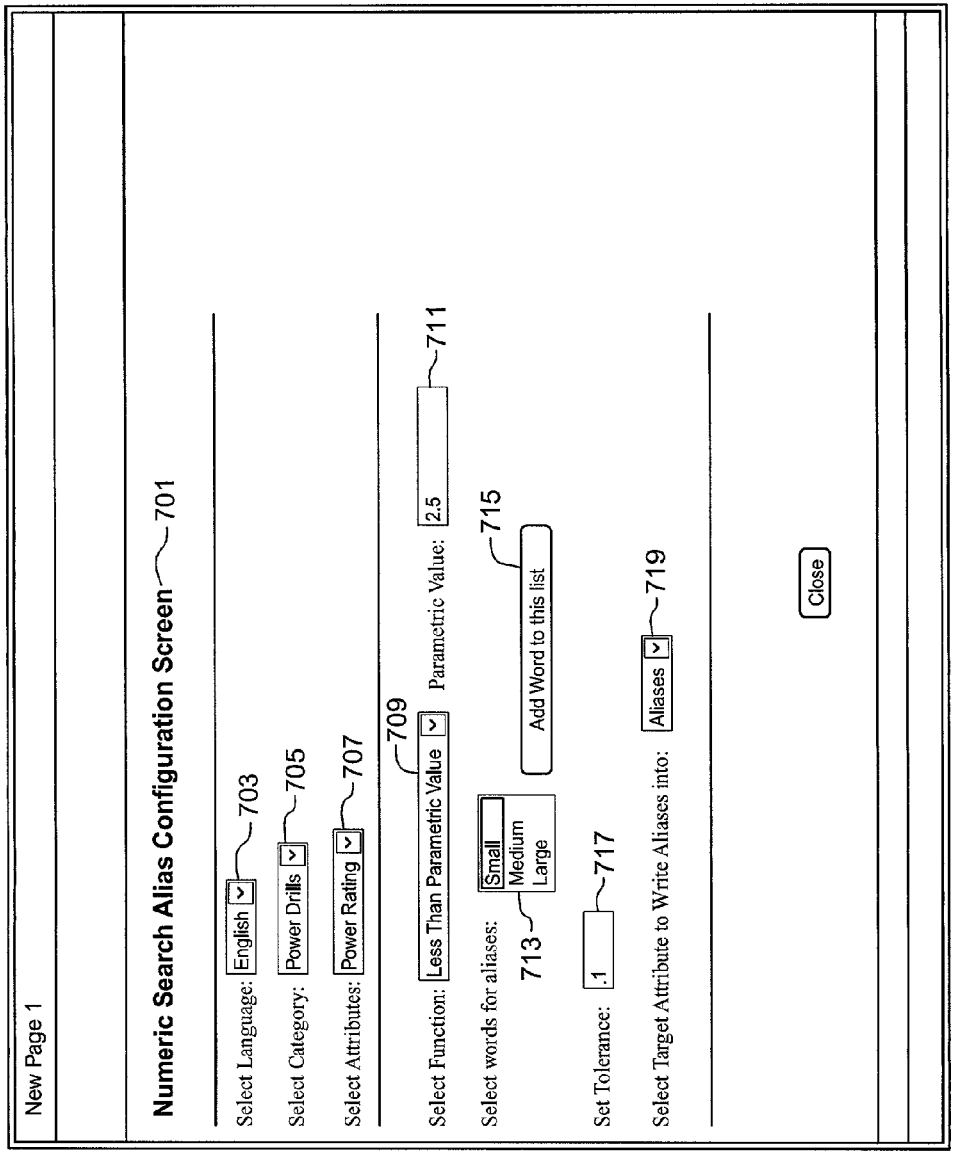
FIG. 7 is an example display of a graphical user interface for configuring text based searches in accordance with FIGS. 1 and 6.

FIG. 7 is an example of a screen for a graphical use interface (GUI) that can be used to configure numeric search aliases as described with respect to FIGS. 1 and 6, above. The screen has a title 701 "Numeric Search Alias Configuration Screen" indicating that this portion of the GUI can be used to configure aliases for numeric searches as described above. There are a number of different selections which can be made in the order shown as top to bottom in the example of FIG. 7, in the order described in FIG. 1 or 6 or in any other desired order. A language pick list 703 allows the user or an administrator or any other authorized person to select any language for the descriptive words that the catalog supports. In the present example, "English" has been selected. A category pick list 705 allows the user to select any of the catalog's categories. Here, "Power Drills," described above, has been selected. As mentioned above, the numeric search aliases or descriptive words can also be based on a search result or any other subset of catalog items or an entire catalog.

Given the items, a pick list of attributes 707 can be generated. The attributes pick list can include all of the attributes of the selected group of items, including both global attributes, such as price and manufacturer, and local attributes, such as chuck size and speed rating. This allows the user to select the type of attribute that will be characterized by the descriptive word. In other words, it allows the user to select the numeric characteristic that will be linked to the selected alias. In the present example, the selected attribute is "Power Rating," an attribute displayed in FIGS. 2 and 3.

In the next section, the user can select a function. This selection is again presented as a function pick list 709, however, the user can be permitted to enter any desired function. A parametric value box 711 allows the user to enter any value appropriate to the function. In the present example, the user has selected a "less than" function and a value of 2.5 (<2.5). A tolerance box 717 allows the user to set a tolerance for the function. In the present example, the function will find all of the power drills with a power rating less than 2.6. In the example of FIGS. 2 and 3, item 1 satisfies the function.

An alias pick list 713 is provided to allow the user to select descriptive words to associate with the function. In FIG. 7, the words "small," "medium," and "large" are displayed and "small" is selected. An Add Words radio button 715 allows the user to call up a dialog box to enter additional aliases beyond the choices listed. In the present example, aliases such as "weak" or "light" or "low" would be better choices than the displayed words. Finally, a target attribute pick list 719 is provided to allow the user to select where the descriptive words are to be added to the catalog after the function is executed. The target attribute pick list allows the user to select, for example, whether the aliases are to be placed in a unique field such as the "alias" attribute, as shown in FIG. 5, an attribute for the particular type of alias as shown in FIG. 3 or any other field in the catalog.

The configuration of the user interface in FIG. 7 is provided as an example that is intended to be easy to use and operate with current hardware and software systems. There are a great variety of modifications and adaptations that can be made. More or fewer choices and more or less information can be shown on a single screen, the display can be combined with sample data from the selected items, other types of user interface devices can be used, etc. In addition, different selection tools other than pick lists and text entry boxes can be used.

FIG. 8 shows a screen portion of an example GUI for managing the various numeric search aliases that have been created. A screen title 801, "Summary of Current Numeric Aliases", Catalog title 803, "MRO Components", and User identification 805, "Administrator" orient the user. A function display 807 allows the user to see all of the current functions, if any, that have been set to operate on the catalog. In the example of FIG. 8, two functions are displayed. Power drills with less than 2.6 HP are identified as low in the "Power Alias" attribute. Abrasive Discs with a grit greater then 200 are identified as fine grit in the "Aliases" attribute or field. This display allows a user to review all of the functions in a single display.

The user can select any of the functions and then select from radio buttons below the function display to perform an action. The radio buttons of FIG. 8 are a Remove button 809, an Edit button 811 and an Add New button 813. Other buttons can be used in addition to or instead of those shown.

An additional field in the Summary screen of FIG. 8 allows the user to set when the functions are executed. In the displayed GUI, all functions are executed on the same schedule, however, any type of scheduling detail can be allowed on a function, attribute, category or catalog basis, among others. In the present example, three execution options are provided, immediately 815, according to a schedule 817 and never 819. The schedule option allows the user to set the schedule. In the present example, the function would be executed daily at 2300 hours. As mentioned above, the GUI of FIG. 8 is provided as an example, more or fewer options can be provided and they can be provided in many different ways.

VII

Figure 9:
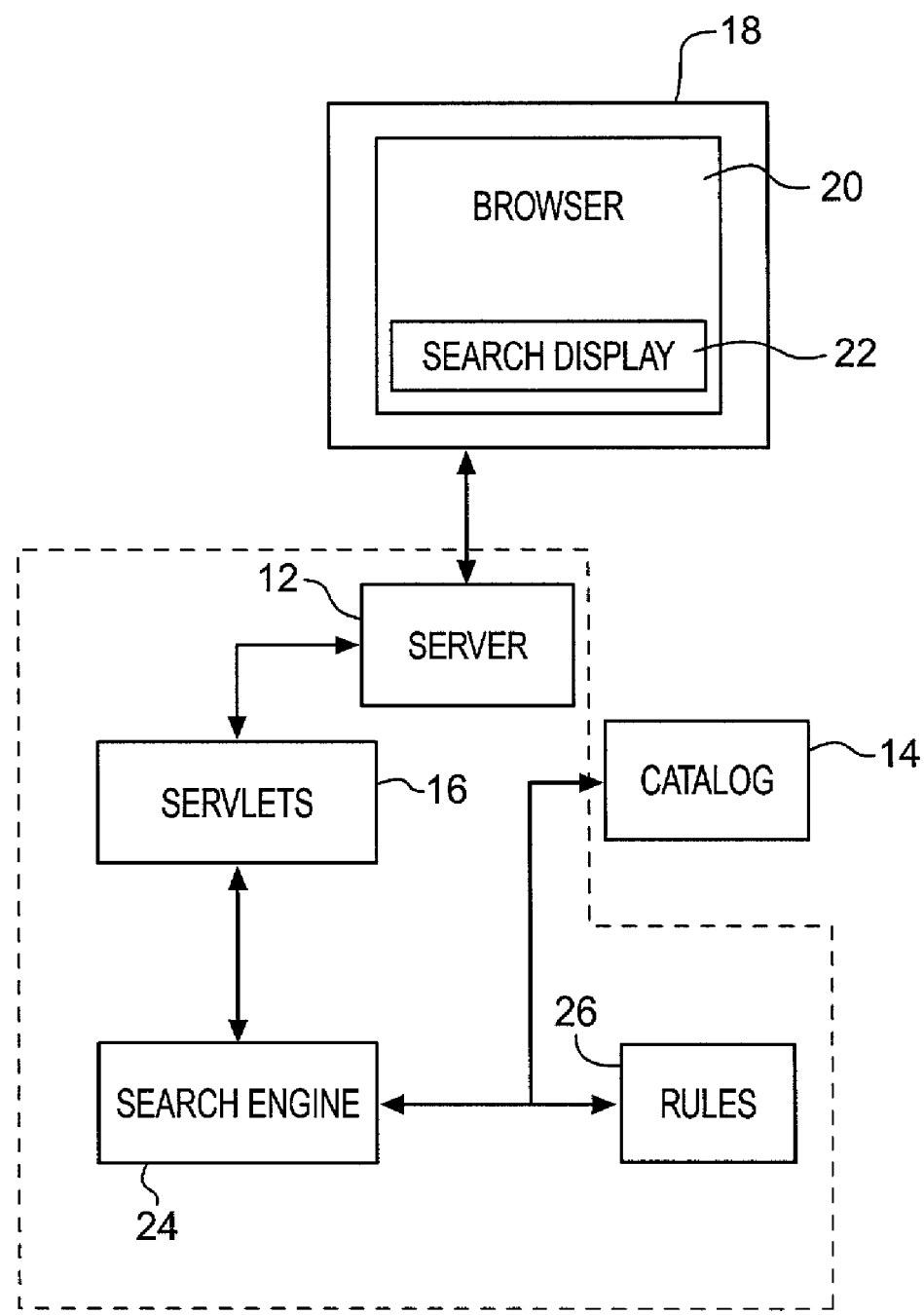
FIG. 9 is a block diagram representation of an electronic catalog system suitable for use in implementing the present invention.

FIG. 9 is a functional block diagram representation of an electronic catalog and automated purchase requisition system. An application server 12 is connected to interact with a database 14 in the form of an electronic catalog which resides in a computer memory storage device at the server or at another device. The catalog can be integrated with the server, co-located with the server or connected using a local or wide area network connection. Users of the system have workstations or clients 18 that are connected to the application server 12 through a local or wide area network such as the Internet or an intranet. The client includes a browser 20 such as a common Internet web browser or dedicated software through which the workstation communicates with the server 12 to render a search display 22.

Commands entered into the web browser software can cause information to be extracted from the database 14 and displayed at the workstation 18 in the search display or in some other display. While the invention is described in terms of browsers communicating using typical web interfaces such as HTTP (Hyper Text Transfer Protocol) and Java instructions, the present invention does not rely on any particular platform or interface. The invention can use web-type browser software or software that has been developed specifically for the purposes of the present invention with unique code, interfaces and display technologies. The invention can be implemented on a single machine or with any kind of distributed processing environment from mainframes with dumb terminals to wireless servers with mobile radio PDAs (Personal Digital Assistant).

The database 14 is an electronic catalog of items, such as products or services. The database 14 can be constructed using a uniform catalog schema so that each product has a single database record that includes all of its different suppliers. However, multiple catalogs, one or more for each supplier, or an aggregated catalog, an aggregate of product information from multiple suppliers, can also be used. In the aggregated catalog, the same item may be listed several times in inconsistent ways.

In one embodiment of the invention, the server 12 uses servlets 16 to operate a search engine 24 that accesses one or more electronic catalogs 14. The search engine is a common and useful application of the present invention, however the present invention can be used whenever records are retrieved from the catalog. It can be used to generate a catalog to be published whether to a marketplace, a purchaser or a seller. It can also be used for any direct product purchase and for any other use of catalog records, such as system administration, management and quality control.

In the search engine example, the application server 12 queries the database 14 through the search engine and directs the results to the workstation 18. The type or format of the catalog is irrelevant as long as the catalog will respond appropriately to a query from the search engine 24. For example, the catalog may reside within a relational database or may reside within an object-oriented database. The catalog can be stored on a disk drive, a tape drive, RAM, or any other computer data storage devices. The application server 12 may reside in a computer attached directly to the storage device, or alternatively may be connected to the storage device 16 through a network. In one embodiment, the servlets are based on Java APIs (Application Program Interface) and JavaScript/HTML (Hyper Text Markup Language) Interface Generation. These use JDBC (Java Database Connectivity) to communicate through the search engine to a separate data store where the catalog resides. The JDBC protocol allows the search engine to communicate with a catalog based on a variety of different commonly used databases including those available from Oracle Corp., Microsoft Corp., and SAP AG.

The search engine 24 is also connected to a rules store 26 through similar Java or HTTP-type protocols. The rules store contains rules that are used to configure, modify or present data that has been requested by the user. As an alternative to the rules store, the rules can be incorporated into the catalog. In one embodiment, the catalog is in the form of XML (Extensible Markup Language) statements and these statements can include values for attributes of catalog items or rules about how to determine values of catalog items. Other types of markup languages, such as SGML (Standard Generalized Markup Language) and HTML (Hyper Text Markup Language) can be used as can other types of database formats.

VIII

Figure 10:
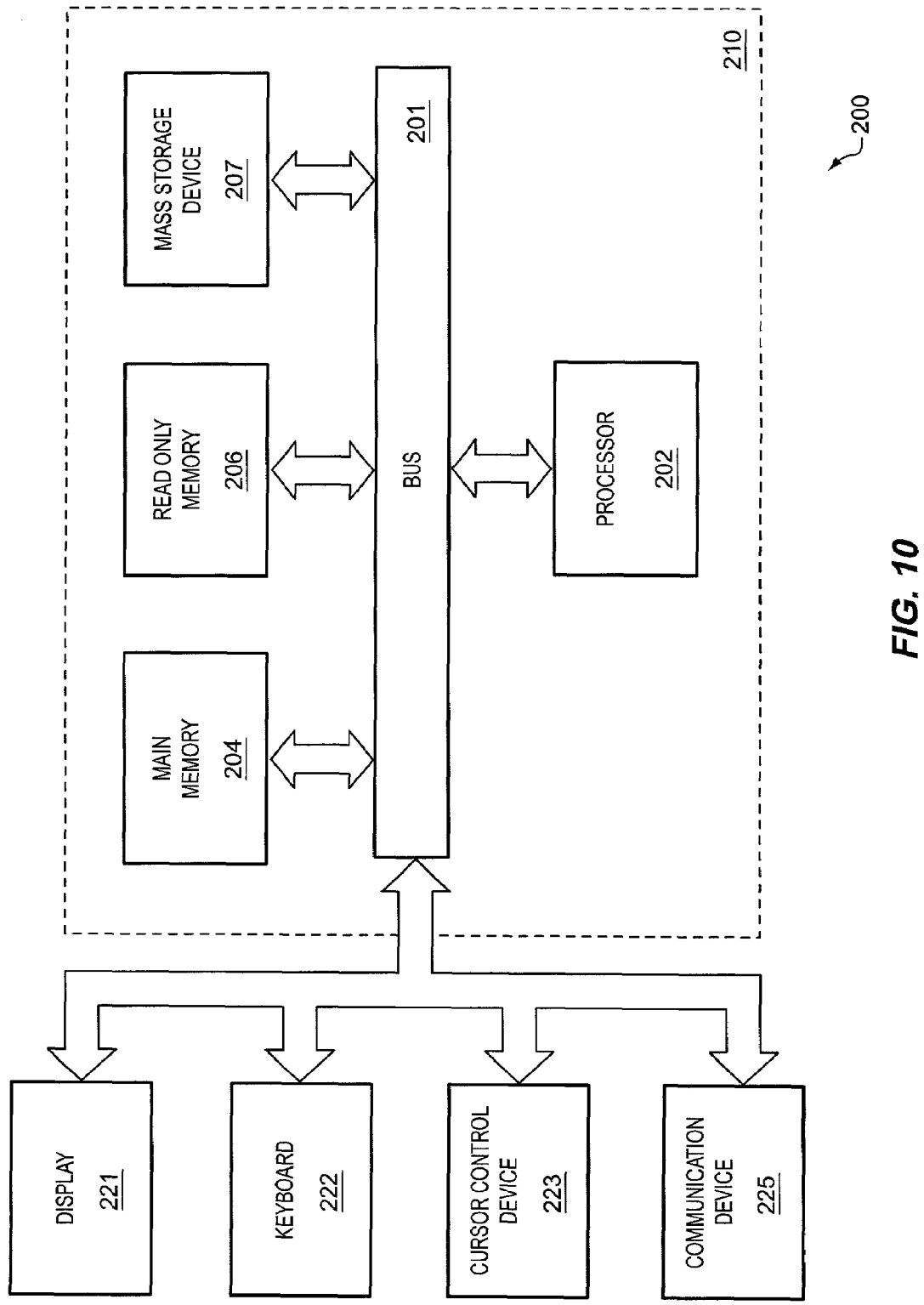
FIG. 10 is a representative example of a computer system suitable for implementing the present invention.

A computer system 200 representing an example of a system upon which features of the present invention may be implemented is shown in FIG. 10. The workstation, search engine, servers, and databases of FIG. 9 will typically be configured similar to what is shown in FIG. 8. Each of these components can be provided using its own computer system or several different components can be combined. For example, the search engine, server, rules, and catalog can all be provided using a single computer system. The computer system can be deployed on a single platform as shown, or different components can be provided on separate platforms so that the bus 201 connects several different platforms together containing different portions or aspects of the mass storage 207 and other system 210 components. The computer system can also be implemented in one or more small portable platforms such as laptops and PDAs.

The computer system 200 includes a bus or other communication means 201 for communicating information, and a processing means such as a microprocessor 202 coupled with the bus 201 for processing information. The computer system 200 further includes a main memory 204, such as a random access memory (RAM) or other dynamic data storage device, coupled to the bus 201 for storing information and instructions to be executed by the processor 202. The main memory also may be used for storing temporary variables or other intermediate information during execution of instructions by the processor.

The computer system may also include a nonvolatile memory 206, such as a read only memory (ROM) or other static data storage device coupled to the bus for storing static information and instructions for the processor. A mass memory 207 such as a magnetic disk or optical disc and its corresponding drive may also be coupled to the bus of the computer system for storing information and instructions such as the various databases.

The computer system can also be coupled via the bus to a display device or monitor 221, such as a cathode ray tube (CRT) or Liquid Crystal Display (LCD), for displaying information to a user. For example, graphical and textual indications of installation status, operations status and other information may be presented to the user on the display device. Typically, an alphanumeric input device 222, such as a keyboard with alphanumeric, function and other keys, may be coupled to the bus for communicating information and command selections to the processor. A cursor control input device 223, such as a mouse, a trackball, or cursor direction keys can be coupled to the bus for communicating direction information and command selections to the processor and to control cursor movement on the display 221.

A communication device 225 is also coupled to the bus 201. The communication device 225 may include a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example. Source Content and the databases can be made available to the computer system in this way.

It is to be appreciated that a lesser or more equipped computer system than the example described above may be preferred for certain implementations. Therefore, the configuration of the exemplary computer system 200 will vary from implementation to implementation depending upon numerous factors, such as price constraints, performance requirements, technological improvements, or other circumstances.

IX

The search engine 24 is activated by the application server 12 in response to inputs from the workstation's web browser. The search engine follows an algorithm, for example the algorithm described in U.S. Pat. No. 6,032,145, the disclosure of which is incorporated fully by reference herein, to search through the catalog for any items related to the query. The algorithm in the above-mentioned patent applies a cascading sequence of progressively broader searches in order to locate records in the catalog. This provides a significantly greater probability that a desired item will be found. However, any other type of search algorithm can be used. A proximity query, for example, is offered in some well-known commercial databases, such as those from Oracle Corp.

In the present application, the search can be a broad search based on any characteristic of an item generally, for example, a search for a Bic brand pen. Alternatively, the search can be very specific for a single item, such as Bic part number SCSM11. In either case, the user inputs a search string to the web browser guided by the search display 22 as shown in FIG. 9. The search string can be free-form or subject to specific structural rules. The particular format of the search algorithm and the input string is not important to the present invention. The search string may comprise search terms in any order. For example, the search string can include the name of an item, a part number for an item, or any descriptive attribute of the item. The search engine can be designed to handle misspellings, word fragments, or any other string that may lead a user to find the desired product within the database 14.

One way to generate the display of FIG. 2 is for the user to enter a query into a browser or dedicated catalog application. The search query is sent over a network, such as the Internet or an intranet, by the client 18 from the browser 20 to the application server 12 using, e.g. HTTP. The application server 12, upon receiving the query parses the HTML packet as appropriate for the search engine 24. It also determines the identity of the user based on embedded ID codes, the packet source or some other approach. The search engine can perform any one or more types of queries using the search string to find a match for the search string within the database 14. Typically, the search string within the HTML packet is compared to catalog text that is identified as attribute values of each item. If no record is identified in response to the query, then the application server builds a results display by compiling the information into an HTML package that can be displayed within the browser to show the user that no records have been found. This display is sent back over the network using, e.g. HTTP to the workstation browser where it is displayed as a web page or a window to the user in the search display 22. The user can then try another query, try another catalog etc.

If a record is identified, then the search engine can retrieve the values of the attributes for the identified records from the catalog. As discussed above, FIG. 2 shows an example of some catalog records with attributes and values displayed. The attributes as displayed are, the chuck size, the speed rating, the weight, the power rating, the type, the power source, and the short description.

Any number of other attributes can also be displayed including, for example, the manufacturer part number, a long description, a supplier part number, availability, etc. These attributes have been selected as examples, but many other attributes can be included in the catalog. The attributes can be viewed as being of two types. Global attributes, such as the category, supplier name, short description, manufacturer name and price, apply to all types of items. Local attributes apply only to certain kinds of items. Local attributes can be such things as chuck size and speed rating as shown, or for other items attributes such as voltage, fuel capacity, connector size, etc. The items each have values for each attribute as shown in the display list 302, although, it is possible that the catalog be incomplete for some items. For example, category has "power drills" as a value. Power Rating is shown with values from 0.5 hp to 5 hp and 100 W to 150 W. These values are stored and maintained in the catalog from which they have been retrieved.

X

While the steps described herein may be performed under the control of a programmed processor, such as the processor 202, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present invention includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The present invention may be provided as a computer program product that may include a machine-readable medium having stored instructions thereon, which may be used to program a computer (or other machine) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Importantly, while embodiments of the present invention are described with reference to finding office supplies and valves in an e-catalog, the method and apparatus described herein are equally applicable to finding, comparing and sorting items in any other type of electronic catalogs and any other source of items including documents, and data files. In addition, while the invention has been described in terms of an electronic catalog, other types of ordered information stored in an electronic form can benefit from the present invention.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method comprising:
   selecting a numeric attribute that is associated with items in an electronic catalog, the catalog containing items that each have a numeric value for the selected numeric attribute, wherein the numeric attribute describes a physical characteristic or property of the items;
   linking the selected numeric attribute to a descriptive word;
   linking the selected numeric attribute to a comparative operator and a comparative value to which the comparison is applied;
   executing the comparative operator on numeric values of the selected numeric attribute to compare the numeric value of all items that have a numeric value for the selected numeric attribute to the comparison value;
   assigning a descriptive word to at least one item based on the results of executing the comparative operator such that the descriptive word can be subsequently used in a search to identify the at least one item and functions as an alias for the numeric value of the selected numeric attribute associated with the at least one item; and
   generating, following the steps of selecting, linking the selected numeric attribute to a descriptive word, linking the selected numeric attribute to a comparative operator, executing, and assigning and in response to an initial, user search query containing the descriptive word, a list and displaying the list to a user, the list having only those items to which the descriptive word used in the search query has been assigned in the step of assigning, the search query entered by the user before an item of the electronic catalog having a value for the selected attribute is displayed.

2. The method of claim 1, wherein linking to a descriptive word comprises linking to a plurality of descriptive words.

3. The method of claim 1, wherein the comparative operator further comprises a tolerance to permit a plurality of items to be assigned the same descriptive word based on the results of the comparative operator.

4. The method of claim 1, further comprising selecting a set of items to which the function is applied, the set of items being selected on the basis of at least one of a category, a classification, and having values for the selected attribute.

5. A method comprising:
   selecting a numeric attribute that is associated with items in a database of items, at least some of the items in the database have a numeric value for the selected numeric attribute, wherein the numeric attribute describes a physical characteristic or property of the items;
   linking the selected numeric attribute to a descriptive word;
   linking the selected numeric attribute to a function;
   executing the function on each numeric value of the selected numeric attribute;
   assigning a descriptive word to at least one item based on the results of executing the function such that the descriptive word can be subsequently used in a search to identify the at least one item and functions as an alias for the numeric value of the selected numeric attribute associated with the at least one item; and
   generating, following the steps of selecting, linking the selected numeric attribute to a descriptive word, linking the selected numeric attribute to a function, executing, and assigning and in response to an initial, user search query containing the descriptive word, a list and displaying the list to a user, the list having only those items to which the descriptive word used in the search query has been assigned in the step of assigning, the search query entered by the user before an item of the database having a value for the selected attribute is displayed.

6. The method of claim 5, wherein linking to a descriptive word comprises linking to a plurality of descriptive words.

7. The method of claim 6, wherein the descriptive words are each associated with a language flag and wherein a descriptive word is selected for display based on the language flag.

8. The method of claim 6, wherein the descriptive words are each associated with a language flag and wherein a descriptive word is made available for text-based searches based on the language flag.

9. The method of claim 5, wherein the function comprises a comparative operator and a value to which the comparison is applied.

10. The method of claim 5, wherein the function comprises a comparative operator that is applied to compare all items having a value for the selected attribute.

11. The method of claim 10, wherein the function comprises a tolerance to permit a plurality of items to be assigned the same descriptive word based on the results of the comparative operator.

12. The method of claim 5, wherein the function comprises a ranking function based on a comparison of values for the selected attribute.

13. The method of claim 12, wherein the ranking function comprises threshold number of items for a descriptive word assignment.

14. The method of claim 5, wherein the function comprises a mathematical function.

15. The method of claim 5, wherein selecting a numeric attribute comprises selecting a numeric attribute by an administrator from a list of numeric attributes available in the database of items.

16. The method of claim 5, wherein linking to descriptive words comprises selecting a numeric attribute by an administrator from a list.

17. The method of claim 5, wherein linking to a function comprises selecting a function by an administrator from a list of functions associated with the selected descriptive words.

18. The method of claim 5, further comprising searching for an item in the database using the assigned descriptive words.

19. The method of claim 5, wherein the database of items comprises an electronic catalog.

20. The method of claim 5, further comprising repeating executing the function upon the addition of items to the database and repeating assigning a descriptive word after repeating executing the function.

21. The method of claim 5, further comprising repeating executing the function upon the deletion of items from the database and repeating assigning a descriptive word after repeating executing the function.

22. The method of claim 5, further comprising selecting a set of items to which the function is applied, the set of items being selected on the basis of at least one of a category, a classification, and having values for the selected attribute.

23. The method of claim 22, further comprising receiving a user identification of at least one of the selected items and using the identified item to further qualify the selected items.

24. The method of claim 18, further comprising generating a list and displaying the list to a user, the list having only those items to which the descriptive words used in the search have been assigned.

25. The method of claim 5, further comprising repeating executing the function upon the modification of values of items in the database and repeating assigning a descriptive word after repeating executing the function.

26. A machine-readable storage medium having stored thereon data representing instructions which, when executed by a machine, cause the machine to perform operations comprising:
   selecting a numeric attribute that is associated with items in a database of items, at least some of the items in the database have a numeric value for the selected numeric attribute, wherein the numeric attribute describes a physical characteristic or property of the items;
   linking the selected numeric attribute to a descriptive word;
   linking the selected numeric attribute to a function;
   executing the function on each numeric value of the selected numeric attribute;
   assigning a descriptive word to at least one item based on the results of the function such that the descriptive word can be subsequently used in a search to identify the at least one item and functions as an alias for the numeric value of the selected numeric attribute associated with the at least one item; and
   generating, following the steps of selecting, linking the selected numeric attribute to a descriptive word, linking the selected numeric attribute to a function, executing, and assigning and in response to a search query containing the descriptive word, a list having only those items to which the descriptive word used in the search query has been assigned in the step of assigning, the search query entered by a user before an item of the database having a value for the selected attribute is displayed.

27. The medium of claim 26, wherein the instructions for linking to a descriptive word comprise instructions which, when executed by the machine, cause the machine to perform further operations comprising linking to a plurality of descriptive words.

28. The medium of claim 26, wherein the function comprises a comparative operator and a value to which the comparison is applied.

29. The medium of claim 26, wherein the function comprises a comparative operator that is applied to compare all items having a value for the selected attribute.

30. The medium of claim 29, wherein the function comprises a tolerance to permit a plurality of items to be assigned the same descriptive word based on the results of the comparative operator.

31. The medium of claim 26, wherein the function comprises a ranking function based on a comparison of values for the selected attribute.

32. The method of claim 31, wherein the ranking function comprises threshold number of items for a descriptive word assignment.

33. The medium of claim 26, further comprising instructions which, when executed by the machine, cause the machine to perform further operations comprising searching for an item in the database using the assigned descriptive words.

34. The medium of claim 26, further comprising instructions which, when executed by the machine, cause the machine to perform further operations comprising repeating executing the function upon any change in the items to the database and repeating assigning a descriptive word after repeating executing the function.

35. The medium of claim 26, further comprising instructions which, when executed by the machine, cause the machine to perform further operations comprising selecting a set of items to which the function is applied, the set of items being selected on the basis of at least one of a category, a classification, and having values for the selected attribute.

36. The medium of claim 26, further comprising instructions which, when executed by the machine, cause the machine to perform further operations comprising generating a list and displaying the list to a user, the list having only those items to which the descriptive words used in the search have been assigned.

37. A graphical user interface (GUI) comprising:
   a display screen;
   numeric attribute selector, set forth in an image on the display screen, to permit a user to select a numeric attribute that is associated with items in a database and to facilitate the communication of a selected numeric attribute to a processor, at least some of the items in the database have a numeric value for the selected attribute, wherein the numeric attribute describes a physical characteristic or property of the items;
   a descriptive word list selector, set forth in an image on the display screen, to permit a user to link a selected numeric attribute to a selected descriptive word in a descriptive word list and to facilitate the communication of such a linking to a processor;

a function selector, set forth in an image on the display screen, to permit a user to link a selected numeric attribute to a function and to facilitate the communication of such a linking to a processor; and a scheduler, set forth in an image on the display screen, to permit a user to schedule execution of a selected function on a plurality of numeric values each of which is associated with an item and a selected numeric attribute in the database for the assignment of a selected descriptive word to one or more items based on the results of the execution of the function and such that the assigned descriptive word can be used in conducting a subsequent search of the database to identify the one or more items to which the descriptive word has been assigned and functions as an alias for the numeric value of the selected numeric attribute associated with each of the one or more items and to facilitate the communication of a scheduling of an execution of a selected function to a processor.

38. The GUI of claim 37, further comprising a language selector to permit a user to select a language so that the descriptive words are each associated with a language flag and descriptive words are made available for text-based searches based on the language flag.

39. The GUI of claim 37, wherein the function comprises a comparative operator and a value to which the comparison is applied.

40. The GUI of claim 37, further comprising a tolerance selector to permit a user to select a tolerance that allows a plurality of items to be assigned the same descriptive word based on the results of the execution of the function.

41. The GUI of claim 37, wherein the numeric attribute selector comprises a pick list having a list of numeric attributes available in the database of items.

42. The GUI of claim 37, further comprising a descriptive word entry box to permit a user to enter a descriptive word and to link the numeric attribute to the entered descriptive word.

43. The GUI of claim 37, wherein function selector comprises a pick list having a list of functions associated with the selected descriptive words.

44. The GUI of claim 37, wherein the scheduler permits the user to schedule repeating executing the function upon any change of items in the database and repeating assigning a descriptive word after repeating executing the function.

45. An apparatus comprising:

a database of items some of which have a numeric value for a selected attribute, wherein the selected attribute describes a physical characteristic or property of the items;

a processor to execute a function on the numeric value associated with the selected attribute of at least some of the items that have a numeric value associated with the selected attribute, and assign a descriptive word to at least one of the items based on the results of the executed function to create a modified database such that the descriptive word can be subsequently used in a search to identify the at least one of the items and functions as an alias for the numeric value of the selected numeric attribute associated with the at least one of the items; and a search engine to search the modified database to find one or more items based on the assigned descriptive word when the assigned descriptive word is received in an initial search query that is entered by a user before an item of the modified database having a value for the selected attribute is identified to the user.

46. The apparatus of claim 45, wherein the descriptive word is associated with a language flag and wherein the descriptive word is made available to the search engine based on the language flag.

47. The apparatus of claim 45, wherein the function comprises a comparative operator and a value to which the comparison is applied.

48. The apparatus of claim 45, wherein the function comprises a tolerance to permit a plurality of items to be assigned the same descriptive word based on the results of the comparative operator.

49. The apparatus of claim 45, wherein the function comprises a ranking function based on a comparison of values for the selected attribute.

50. The apparatus of claim 45, further comprising a user interface to permit an administrator to select the function from a list of functions associated with the selected descriptive words.

51. The apparatus of claim 45, wherein the database comprises an electronic catalog.

52. The apparatus of claim 45, further comprising search display engine coupled to the search engine to generate a list of found items and display the list to a user, the list having only those items to which the descriptive words used in the search have been assigned.

53. The apparatus of claim 45, further comprising a scheduler to instruct the processor to repeat execution of the function upon the modification of values of items in the database and to repeat assigning a descriptive word after repeating execution of the function.

* * * * *